United States Patent
Rice et al.

(10) Patent No.: US 11,296,939 B2
(45) Date of Patent: Apr. 5, 2022

(54) NETWORK RECONFIGURATION WITH CUSTOMER PREMISES-BASED APPLICATION HOSTING

(71) Applicant: AT&T Intellectual Property I, L.P., Atlanta, GA (US)

(72) Inventors: Christopher W. Rice, Southlake, TX (US); Mazin Gilbert, Warren, NJ (US); Igal Elbaz, Dallas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 261 days.

(21) Appl. No.: 16/037,638

(22) Filed: Jul. 17, 2018

(65) Prior Publication Data
US 2020/0028744 A1    Jan. 23, 2020

(51) Int. Cl.
H04L 12/24    (2006.01)
H04L 41/0813    (2022.01)
H04L 41/0806    (2022.01)

(52) U.S. Cl.
CPC ...... H04L 41/0813 (2013.01); H04L 41/0806 (2013.01)

(58) Field of Classification Search
CPC .................. H04L 41/0813; H04L 41/0806
See application file for complete search history.

(56) References Cited

U.S. PATENT DOCUMENTS

| | | | |
|---|---|---|---|
| 9,690,683 B2 | 6/2017 | Skerry et al. | |
| 2011/0243142 A1* | 10/2011 | Kwon | H04L 45/745 370/400 |
| 2014/0201374 A1* | 7/2014 | Ashwood-Smith | H04L 49/70 709/226 |
| 2014/0317261 A1* | 10/2014 | Shatzkamer | G06F 9/45558 709/223 |
| 2015/0281080 A1 | 10/2015 | Kwon et al. | |
| 2016/0173369 A1* | 6/2016 | Chiba | H04L 12/40013 370/390 |
| 2016/0212017 A1* | 7/2016 | Li | H04L 67/18 |
| 2017/0006116 A1 | 1/2017 | Kelly et al. | |
| 2017/0078216 A1* | 3/2017 | Adolph | G06F 9/45558 |
| 2017/0195171 A1* | 7/2017 | Wohlert | H04L 67/34 |

(Continued)

FOREIGN PATENT DOCUMENTS

WO    WO 2018000240    1/2018

*Primary Examiner* — Hassan Kizou
*Assistant Examiner* — Hector Reyes

(57) ABSTRACT

Methods, computer-readable media, and devices for instantiating a service provider application of a network service on a customer premises-based device are disclosed. For example, a processing system of a telecommunication network having at least one processor may receive a request for a network service, identify a set of resources for the network service, the set of resources for the network service including at least a first service provider application, and determine that a current configuration of the telecommunication network does not provide the set of resources. The processing system may further reconfigure the telecommunication network to provide the set of resources, the reconfiguring including instantiating the at least the first service provider application of the network service on a customer premises-based device, and deploying the network service to the telecommunication network that is reconfigured.

20 Claims, 5 Drawing Sheets

(56) References Cited

U.S. PATENT DOCUMENTS

| | | |
|---|---|---|
| 2017/0272523 A1 | 9/2017 | Cillis et al. |
| 2017/0288998 A1 | 10/2017 | Kin et al. |
| 2018/0048716 A1* | 2/2018 | Madhayyan ........ G06F 9/45558 |
| 2018/0103091 A1 | 4/2018 | Kwak et al. |
| 2018/0191581 A1* | 7/2018 | Yu ...................... H04L 41/0806 |
| 2018/0191838 A1* | 7/2018 | Friedman .............. H04L 67/148 |
| 2018/0219762 A1* | 8/2018 | Wang ...................... H04L 45/04 |
| 2018/0262431 A1* | 9/2018 | Zhang ................... H04L 47/125 |
| 2020/0014561 A1* | 1/2020 | Koat ..................... H04L 45/745 |

\* cited by examiner

NETWORK RECONFIGURATION WITH CUSTOMER PREMISES-BASED APPLICATION HOSTING

The present disclosure relates generally to telecommunication network and customer edge interfaces, and more particularly to methods, non-transitory computer-readable media, and devices for instantiating a service provider application of a network service on a customer premises-based device.

BACKGROUND

Upgrading a telecommunication network to a software defined network (SDN) architecture implies replacing or augmenting existing network elements that may be integrated to perform a single function with new network elements. The replacement technology may comprise a substrate of networking capability, often called network function virtualization infrastructure (NFVI) that is capable of being directed with software and SDN protocols to perform a broad variety of network functions and services. Different locations in the telecommunication network may be provisioned with appropriate amounts of network substrate, and to the extent possible, routers, switches, edge caches, middle-boxes, and the like, may be instantiated from the common resource pool. In addition, where the network edge has previously been well-defined, the advent of new devices and SDN architectures are pushing the edge closer and closer to the customer premises and to devices that customers use on a day-to-day basis.

SUMMARY

In one example, the present disclosure describes a device, computer-readable medium and method for instantiating a service provider application of a network service on a customer premises-based device. For instance, in one example, a processing system of a telecommunication network having at least one processor may receive a request for a network service, identify a set of resources for the network service, the set of resources for the network service including at least a first service provider application, and determine that a current configuration of the telecommunication network does not provide the set of resources. The processing system may further reconfigure the telecommunication network to provide the set of resources, the reconfiguring including instantiating the at least first service provider application of the network service on a customer premises-based device, and deploying the network service to the telecommunication network that is reconfigured.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
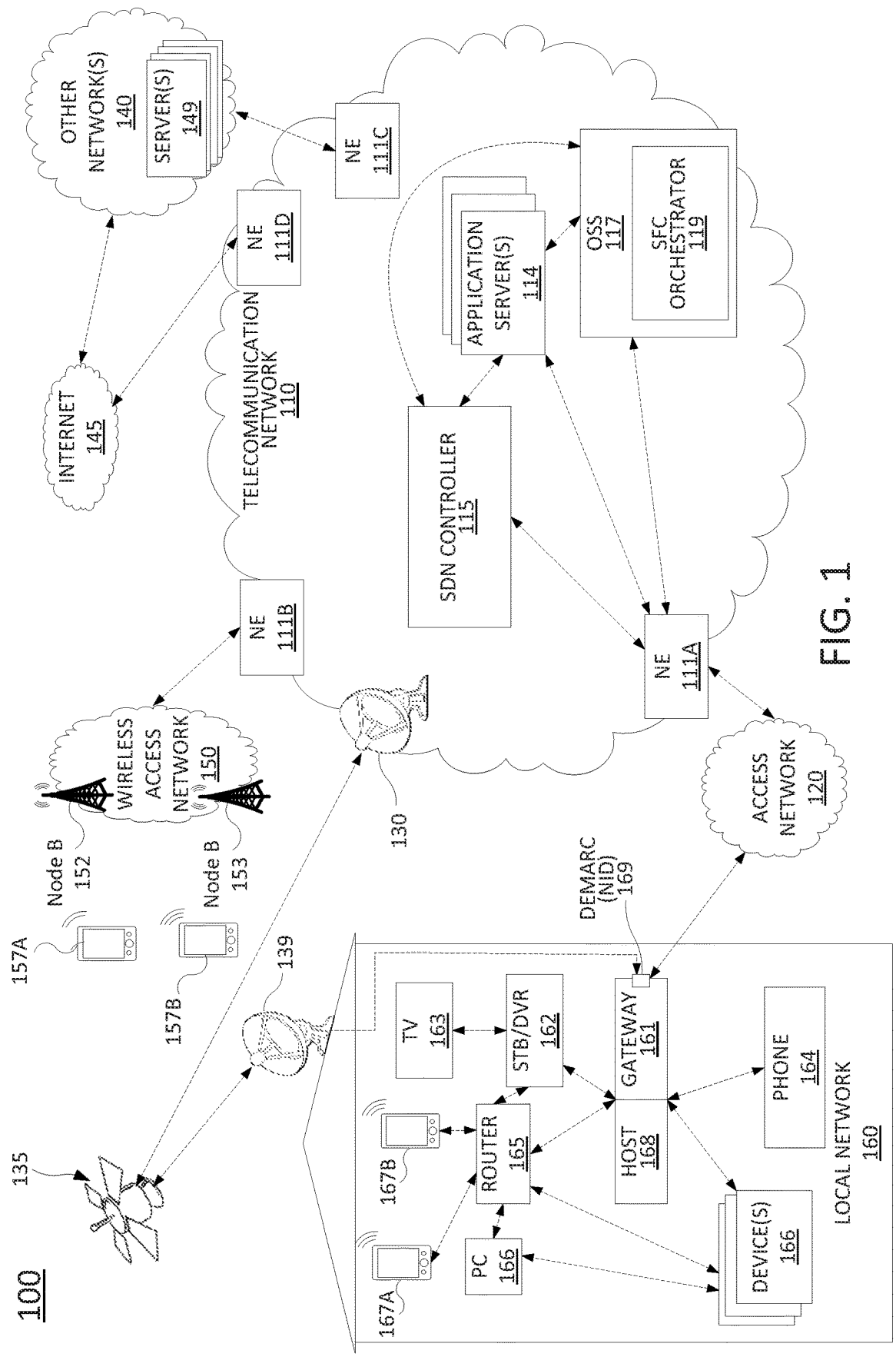
FIG. 1 illustrates an example network related to the present disclosure.

In traditional networks, devices have specific functions and the devices' relative placement in a network infrastructure is well known. In a software defined network (SDN) infrastructure, service elements as defined by virtual network functions (VNFs) are constantly being created and destroyed. This intrinsic nature results in an ever changing network topology over which network services may be deployed. As a result, the network edge may morph according to the ever changing network topology, which may bring about a non-optimal network service deployment at the network edge.

Examples of the present disclosure relate to a telecommunication network having, at least in part, a SDN infrastructure. In one example, a telecommunication network-based processing system, such as a service function chain (SFC) orchestrator and/or an SDN controller, receives a request for a new network service deployment. In one example, the processing system determines the service deployment needs for the particular network service. This understanding is translated into a dynamic learning map which represents the existing network (including both devices and connectivity). Through the overlay of the service deployment needs on top of the dynamic learning map, the preferred devices (e.g., NFVI or non-NFVI/non-SDN-based devices) to implement the network service are identified. In one example, the processing system may next, based upon the devices' resources as compared to the service deployment needs, identify the VNFs that can be spun-up on the devices that are identified (or VNFs that are already deployed and which may be assigned to or otherwise utilized in a service function chain (SFC) of the network service). In one example, where there is no availability for/of one or more of the VNFs at one or more of the preferred host devices, the processing system may arrange for handoffs of functionality between VNFs on the intended host device(s) and "neighboring" host device(s). As such, the processing system reconfigures the telecommunication network, optimized with an expectation of minimal latency characteristics for service delivery. For instance, for time sensitive traffic (e.g., video, interactive video, interactive audio, etc.), latency may be a primary factor to account for when calculating optimal network service overlays (e.g., SFCs utilizing certain applications on certain host devices, and utilizing certain links through the network).

In accordance with the present disclosure, available host devices (e.g., represented in the dynamic learning map for the existing network) may include "customer edge" devices which may be linked to the "network edge." In particular, as the migration of the network edge to the customer edge continues, VNFs associated with various network services can be managed and orchestrated based upon equivalent service level agreements (SLAs) ("customer edge" or "network edge"). Thus, examples of the present disclosure provide for new service delivery and network optimization for service delivery via both telecommunication network-based and customer premises-based devices. These and other aspects of the present disclosure are described in greater detail below in connection with the examples of FIGS. 1-5.

To better understand the present disclosure, FIG. 1 illustrates an example network 100, related to the present disclosure. As shown in FIG. 1, the network 100 connects mobile devices 157A, 157B, 167A and 167B, and local network devices such as gateway 161, set-top boxes (STB) 162, television (TV) 163, phone 164, router 165, personal computer (PC) 166A, and so forth, with one another and with various other devices via a telecommunication network 110 (e.g., a telecommunication service provider network), a wireless access network 150 (e.g., a cellular network), an access network 120, other networks 140 and/or the Internet 145.

In one example, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative embodiment, wireless access network 150 is shown as a UMTS terrestrial radio access network (UTRAN) subsystem. Thus, elements 152 and 153 may each comprise a Node B or evolved Node B (eNodeB).

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one embodiment, any one or more of mobile devices 157A, 157B, 167A, and 167B may have both cellular and non-cellular access capabilities and may further have wired communication and networking capabilities.

As illustrated in FIG. 1, network 100 includes a telecommunication network 110. In one example, telecommunication network 110 may combine core network components of a cellular network with components of a triple play service network; where triple-play services include telephone services, Internet services and television services to subscribers. For example, telecommunication network 110 may functionally comprise a fixed mobile convergence (FMC) network, e.g., an IP Multimedia Subsystem (IMS) network. In addition, telecommunication network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers (e.g., "provider edge" routers) to interconnect the telecommunication network 110 with other networks 140, Internet 145, wireless access network 150, access network 120, and so forth.

As illustrated in FIG. 1, telecommunication network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. Application servers 114 may further include business information database (BID) storage servers. For instance, the network operator of telecommunication network 110 may receive and store third-party information relating to subscribers. In one example, application servers 114 may represent a distributed file system.

With respect to television service provider functions, application servers 114 may comprise television servers for the delivery of television content, e.g., a broadcast server, a cable head-end, interactive TV/video-on-demand (VOD) server(s), advertising/television commercial servers, and so forth. For example, telecommunication network 110 may comprise a video super hub office, a video hub office and/or a service office/central office.

In one example, one or more of application servers 114 receive, store, and/or provide service provider applications (e.g., executable code and/or other data to support a service provider application in accordance with the present disclosure), information relating to service function chains (SFCs) for various subscribers, for various network service provider purposes, and so forth. For instance, application servers 114 may store SFC labels, label assignments to particular SFCs, the component applications/services within various SFCs, the quality of service (QoS)/priority assigned to various SFCs, and so forth. In one example, each of application servers 114 may comprise a computing system or server, such as computing system 500 depicted in FIG. 5, and may be configured to provide one or more operations or functions for instantiating a service provider application of a network service on a customer premises-based device, as described herein. It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/ or programs to function differently depending upon the values of the variables or other data structures that are provided. It should also be noted that the foregoing are only several examples of the types of relevant application servers 114 that may be included in telecommunication network 110 in connection with examples of the present disclosure for instantiating a service provider application on a customer premises-based device, as described herein.

In one example, any one or more of the components of telecommunication network 110 may comprise a network function virtualization infrastructure (NFVI), e.g., software-defined networking (SDN) host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, any one or more of application servers 114 may also represent a NFVI. In addition, when comprised of various NFVIs, the telecommunication network 110 may be expanded (or contracted) to include more or less components than the state of telecommunication network 110 that is illustrated in FIG. 1. In this regard, the telecommunication network 110 may also include a SDN controller 115 that is responsible for instantiating, configuring, managing, and releasing VNFs. In one example, the SDN controller 115 may comprise a computing system or server, such as computing system 500 depicted in FIG. 5, and may be configured to provide one or more operations or functions in connection with instantiating a service provider application of a network service on a customer premises-based device, as described herein. For example, in an SDN architecture, the SDN controller 115 may instantiate VNFs on shared hardware, e.g., NFVI/host devices/SDN nodes, which may be physically located in various places. In one example, the configuring, releasing, and reconfiguring of SDN nodes is controlled by the SDN controller 115, which may store configuration codes, e.g., computer/processor-executable programs, instructions, or the like for various functions which can be loaded onto an SDN node. In another example, the SDN controller 115 may instruct, or request an SDN node to retrieve appropriate configuration codes from a network-based repository, e.g., a storage device, to relieve the SDN controller from having to store and transfer configuration codes for various functions to the SDN nodes. Accordingly, the SDN controller 115 may be connected directly or indirectly to any one or more network elements of telecommunication network 110, and of the network 100 in general. Due to the relatively large number of connections available between SDN controller 115 and the other network elements, various links to the SDN controller 115 are omitted from illustration in FIG. 1 for clarity reasons.

In one example, telecommunication network 110 may further include operations support systems (OSS) 117. An OSS refers to systems that provide operations support, such as provisioning and maintenance functions, inventory functions, and so forth for the telecommunications network infrastructure. For instance, OSS 117 may include a subscriber database, a subscriber provisioning system, a network equipment inventory system, etc. One instantiation of the OSS may comprise a service function chain (SFC) orchestrator 119, which may comprise a computing system or server, such as computing system 500 depicted in FIG. 5, and may be configured to provide one or more operations or functions for instantiating a service provider application of a network service on a customer premises-based device, as described herein. For instance, SFC orchestrator 119 may perform various operations as described in connection with the example method 300 of FIG. 3. Thus, in one example, OSS 117 (e.g., SFC orchestrator 119 and/or one or more other components of the OSS 117) may store various information as described above in connection with application servers 114, such as SFC labels and assignments to particular SFCs, the component applications/services within various SFCs, the quality of service (QoS)/priority assigned to various SFCs, and so forth.

In one example, SFC orchestrator 119 may cause service provider applications to be instantiated, transferred from one NFVI and/or host device to another, torn down, reconfigured, and so forth, via instructions to one or more SDN controllers. For instance, SDN controller 115 may be assigned to and responsible for NFVI within a particular portion of telecommunication network 110, while one or more additional SDN controllers (not shown) may be assigned to other portions of the telecommunication network 110. Thus, SFC orchestrator 119 may interact with any such SDN controller(s) 115 in connection with the performance of operations of the example method 300 and/or other operations as described herein. Due to the relatively large number of connections available between OSS 117 and other network elements, various links to OSS 117 are omitted from illustration in FIG. 1.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of telecommunication network 110 may provide a cable television service, an IPTV service, or any other types of television service to subscribers via access network 120. In this regard, access network 120 may include a node, e.g., a mini-fiber node (MFN), a video-ready access device (VRAD), or the like. However, in another example, such a node may be omitted, e.g., for fiber-to-the-premises (FTTP) installations. Access network 120 may also transmit and receive communications between local network 160 and telecommunication network 110 relating to voice telephone calls, communications with servers 149 via the Internet 145 and/or other networks 140, and so forth.

Alternatively, or in addition, the network 100 may provide television services to local network 160 via a satellite broadcast. For instance, ground station 130 may receive television content from television servers 114 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the telecommunication network 110. In another example, satellite 135 may be controlled and/or operated by a different entity and may carry television broadcast signals (or other downlink and/or uplink communications) on behalf of the telecommunication network 110 and/or the local network 160.

In one example, local network 160 may include a gateway 161, which receives data/communications associated with different types of media, e.g., television, phone, and Internet, and separates these communications for the appropriate devices. The data/communications may be received via access network 120 and/or via satellite receiver 139, for instance. In one example, the gateway 161 may comprise an optical network terminal (ONT), e.g., where the access network 120 comprises a fiber optic access network with a fiber to the home (FTTH)/fiber to the premises (FTTP) deployment to local network 160. In one example, all communications into and out of the local network 160 may pass through a physical demarcation point (demarc) 169, also referred to as a network interface device (NID). However, with respect to satellite-based communications, in one example, the physical demarc may comprise the satellite receiver 139. In other words, the satellite receiver 139 is owned and operated, and is the responsibility of the subscriber to maintain.

In one example, television data is forwarded to set-top boxes (STB)/digital video recorders (DVR) 162 to be decoded, recorded, and/or forwarded to television (TV) 163 for presentation. Similarly, telephone data is sent to and received from phone 164; Internet communications are sent to and received from router 165, which may be capable of both wired and/or wireless communication. In turn, router 165 receives data from and sends data to the appropriate devices, e.g., personal computer (PC) 166A, mobile devices 167A, and 167B, and so forth. In one example, router 165 may further communicate with TV (broadly a display) 163, e.g., where the television is a smart TV. In one example, router 165 may comprise a wired Ethernet router and/or an Institute for Electrical and Electronics Engineers (IEEE) 802.11 (Wi-Fi) router, and may communicate with respective devices in local network 160 via wired and/or wireless connections.

In accordance with the present disclosure the network 160 may further include a host 168 attached, coupled to, or integrated with gateway 161. In one example, the host 168 may comprise a computing system or server, such as computing system 500 depicted in FIG. 5, and may be configured to provide one or more operations or functions in connection with instantiating a service provider application of a network service on a customer premises-based device, as described herein. For instance, host 168 may comprise a physical computing device or processing system running a virtual machine monitor (VMM), or hypervisor, that is controllable by one or more devices of telecommunication network 110, such as SDN controller 115 and/or SFC orchestrator 119, to instantiate, maintain, and/or tear down one or more service provider applications on the host 168, e.g., comprising one or more virtual machines (VMs), containers, or the like. In accordance with the present disclosure, host 168 may also be controllable to instantiate and maintain one or more customer applications on the host 168, e.g., comprising one or more VMs, containers, or the like. For instance, one of the devices 166 may be configured to control customer applications on host 168. Alternatively, or in addition, one or more remote devices controlled by a person or entity associated with local network 160 may remotely configure host 168 to instantiate, maintain, reconfigure, and/or tear down customer applications on host 168.

In one example, local network 160 may represent an enterprise network, e.g., of a business, an educational or medical institution, or the like. Accordingly, in one example, local network 160 may further include devices 166 which may comprise servers deployed in local network 160 hosting various customer applications and related data, such as an inventory system, a contact management system, a call routing system, an interactive voice response (IVR) system, a firewall, a content filter, an intrusion detection system (IDS), and so forth.

In accordance with the present disclosure, the service provider applications instantiated on host 168 may be configured into service function chains (SFCs) involving other service provider applications, e.g., on host 168, in telecommunication network 110, e.g., at application severs 114 or NEs 111A-111D, and/or at servers 149. In addition, the service provider applications instantiated on host 168 may also be configured into SFCs with customer applications on host 168, devices 166, other devices in local network 160, servers 149 in one or more other (remote) networks 140, and so forth. In one example, the SFC orchestrator 119 and/or SDN controller 115, and the NFVI controllable by the SFC orchestrator 119 and/or SDN controller 115 (e.g., host 168 in local network 160, application servers 114 and NEs 111A-111D in telecommunication network 110, and any NFVI controllable by SFC orchestrator 119 and/or SDN controller 115 in other networks 140, such as servers 149), may be referred to as a software defined wide area network (SD-WAN). In one example, SFCs may be controlled (e.g., established, maintained, reconfigured, torn down, and so forth) by SFC orchestrator 119 and/or SDN controller 115 in conjunction with one or more customer-controlled devices, such as one of the devices 166, or the like.

Further details regarding the functions that may be implemented by SFC orchestrator 119, SDN controller 115, OSS 117, application servers 114, gateway 161, host 168, devices 166, and so on are discussed in greater detail below in connection with the examples of FIGS. 2-4. In addition, those skilled in the art will realize that the network 100 may be implemented in a different form than that which is illustrated in FIG. 1, or may be expanded by including additional endpoint devices, access networks, network elements, application servers, etc. without altering the scope of the present disclosure. For example, telecommunication network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth. In still another example, functions that are described herein as being performed by SDN controller 115 and/or OSS 117 may alternatively or additionally be performed by a SFC orchestrator, or the like. In addition, for ease of illustration various intermediate devices, such as gateways, border elements, layer 3 routers, MPLS routers, SFC forwarders, and so forth are omitted from FIG. 1.

Figure 2:
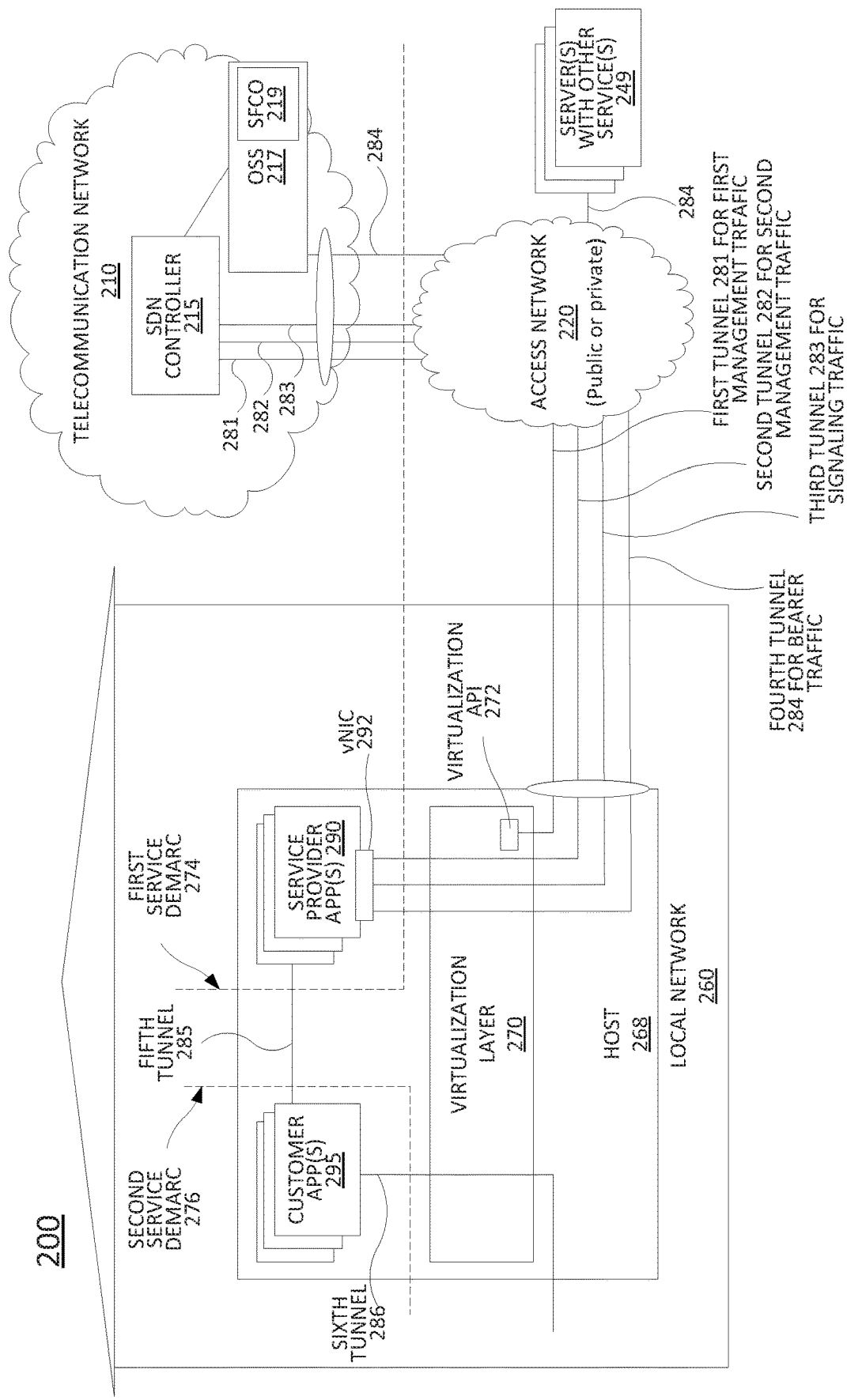
FIG. 2 illustrates an example system for instantiating a service provider application of a network service on a customer premises-based device, in accordance with the present disclosure.

FIG. 2 illustrates an example system 200 for instantiating a service provider application of a network service on a customer premises-based device, in accordance with the present disclosure. The system 200 comprises several components which are the same as or similar to those illustrated in example of FIG. 1, such as telecommunication network 210 (e.g., a telecommunication service provider network), SDN controller 215, OSS 217, SFC orchestrator (SFCO) 219, access network 220, local network 260, host 268, and servers 249.

As also shown in FIG. 2, a virtualization layer 270 is illustrated as being running on the host 268. The virtualization layer 270 may comprise, for example, a hypervisor or virtual machine monitor (VMM). In one example, the virtualization layer 270 includes a virtualization application programming interface (API) 272. In accordance with the present disclosure, the virtualization API 272 may be provided for one or more devices of telecommunication network 210 to access and control the virtualization layer 270 on the host 268. In one example, the virtualization API 272 provides a limited set of commands that the devices in telecommunication network 210 may utilize to control the virtualization layer 270. For instance, one or more commands may be provided to allow the instantiation of a new service provider application on the host 268. The one or more commands may specify certain operating parameters, such as an application priority for processor time, a memory allocation, and so forth. In one example, the one or more commands may specify a location (e.g., a uniform resource locator (URL), or other network address identifiers) where an image of the service provider application can be obtained. The image may include instructions, code, and other data for the service provider application to function in accordance with its designated purpose. In one example, the virtualization layer 270 may obtain the service provider application in accordance with the URL. In another example, the service provider application may be stored in a storage portion (e.g., a magnetic drive, solid-state drive, etc.) of the host 268 and accessed by the virtualization layer 270 in response to a command to instantiate the service provider application. Similarly, one or more commands may be provided to allow the decommissioning of a service provider application on the host 268 by one or more devices in the telecommunication network 210.

As illustrated in FIG. 2, a number of service provider applications (apps) 290 may be instantiated and/or running on host device 268 via the virtualization layer 270. The service provider applications 290 may include, for example: forwarding, labeling, web acceleration, intrusion detection, encryption, video processing, blurring, artificial intelligence (AI)/machine learning (ML) applications, content filtering, general web applications, and so on. In one example, each of the service provider applications 290 may comprise a virtual network interface card (vNIC), e.g., vNIC 292. For instance, vNIC 292 may be assigned a media access control (MAC) address and provided to one of service provider applications 290. In one example, the MAC address of vNIC 292 may be valid only within the local network 260. In one example, the MAC address may be assigned from a MAC pool designated for host 268 and/or the local network 260. The one of the service provider applications 290 may then be accessed by directing traffic to the MAC address of vNIC 292. For instance, in the example of FIG. 2, remote devices (external to local network 260) may access the one of service provider applications 290 via the vNIC 292 by addressing traffic to the IP address associated with host 268 (and/or a gateway or other intermediate devices facing access network 220) along with the MAC address of vNIC 292 e.g., in an Ethernet frame encapsulated within the IP packet.

In accordance with the present disclosure, various network tunnels may be utilized for management traffic, signaling traffic, and bearer traffic associated with the service provider applications 290. To illustrate, SDN controller 215 may establish a first tunnel 281 for first management traffic between the SDN controller 215 and the virtualization API 272. The first management traffic may include commands and responses relating to establishing/instantiating service provider applications 290 on host 268 and tearing down the service provider applications 290 as described above.

The first tunnel may comprise, for example, an application layer tunnel and/or a session layer tunnel (e.g., a session using Transport Layer Security (TLS), Generic Routing Encapsulation (GRE), IPSec, etc.), a link layer tunnel (e.g., a session using Layer 2 Tunneling Protocol (L2TP) or the like), a Multi-Protocol Label Switching (MPLS) tunnel, and so forth. The first tunnel may comprise a secure tunnel wherein all datagrams, packets, or other traffic that pass via the secure tunnel are encrypted using one or more encryption keys and/or encryption key pairs, e.g., using Diffie-Hellman key exchange or the like, such that only the SDN controller 215 and the virtualization layer 270 may access the traffic. In one example, the virtualization layer 270 (e.g., a VMM) may be logically treated as a separate, standalone device from the perspective of the SDN controller 215. In other words, the SDN controller 215 may share encryption keys, authentication keys, etc. with the virtualization layer 270, whereas the underlying hardware device (host 268) hosting the virtualization layer 270 partitions other logical entities on the host 268 with separate memory space, storage, and so forth such that the encryption keys and other information regarding the first tunnel is only available to the virtualization layer 270 and not to any host operating system, any guest operating systems or other hypervisors/VMMs, and so forth.

SDN controller 215 may also establish a second tunnel 282 for second management traffic between the SDN controller 215 and one of the service provider applications 290. In one example, the second tunnel 282 for the second management traffic may be between the SDN controller 215 and the vNIC 292 associated with the one of the service provider applications 290. The second management traffic may provide commands, operational data, and/or other information from the SDN controller 215 to configure the one of service provider applications 290 to function in a particular way. The second tunnel may be of the same or a similar nature as the first tunnel described above, e.g., an application layer tunnel and/or a session layer tunnel using TLS, GRE, IPSec, etc., a link layer tunnel using LT2P or the like, an MPLS tunnel, and so forth. In one example, the first tunnel and the second tunnel may share a single application layer encryption.

In one example, signaling traffic for the one of the service provider applications 290 may share the second tunnel for the second management traffic 283. However, in another example, a third tunnel 283 may be established for the signaling traffic. As illustrated in FIG. 2, signaling traffic (e.g., via third tunnel 283) may be exchanged between service provider applications 290 and SDN controller 215 and/or OSS 217 in telecommunication network 210. The signaling traffic may relate to routing of bearer traffic, may relate to the requesting and providing of operational records, statistics, and other information from one of the service provider applications 290, such as call detail records (CDRs), and so forth.

Similarly, a fourth tunnel 284 for bearer traffic may be established for the one of the service provider applications 290 via the vNIC 292. In the example of FIG. 2, the bearer traffic may be exchanged between the one of the service provider applications 290 and one or more servers 249 with other services. In particular, the bearer traffic may be tunneled via the access network 220 (which may be operated by a same or a different entity as telecommunication network 210) in a similar manner to the second management traffic (e.g., via second tunnel 282) and the signaling traffic (e.g., via third tunnel 283) for the one of the service provider applications via vNIC 292. It should be noted that in one example, the signaling traffic and bearer traffic may be separately encapsulated for transport via access network 220. However, in another example, signaling traffic and bearer traffic may share a same tunnel/encapsulation and/or a same set of encryption keys. In still another example, the signaling traffic may be exchanged with a device that is not deployed in telecommunication network 210. In one example, the establishment of the various tunnels 281-284 may be established by the SDN controller 215 in accordance with instruction(s) from the SFC orchestrator 219.

As further illustrated in FIG. 2, one or more customer applications 295 may also be instantiated on host 268 via virtualization layer 270. In accordance with the present disclosure, a customer, subscriber, or other persons or entities operating local network 260 may provide and control host 268. In addition, in one example, the virtualization layer 270 may also be provided and controlled by the operator of local network 260. The virtualization API 272 may therefore provide to telecommunication network 210 a limited ability to control virtualization layer 270, e.g., with only a certain set of commands to instantiate and tear down service provider applications 290. In one example, the virtualization API 272 may impose an adherence to limitations on processor utilization, memory utilization, network bandwidth, and so forth that may be set by the operator of local network 260. In this example, the responsibilities of the telecommunication service provider of telecommunication network 210 and the operator of local network 260 may be indicated by a first service demarcation point (demarc) 274. In another example, the operator of local network 260 may provide and control host 268 while the telecommunication service provider of telecommunication network 210 may provide and control the virtualization layer 270. In this example, the responsibilities of the telecommunication service provider of telecommunication network 210 and the operator of local network 260 may be indicated by a second service demarcation point (demarc) 276.

In accordance with the present disclosure, one or more of the service provider applications 290 may be configured to operate in one or more service function chains (SFCs) involving others of the service provider applications 290, services (e.g., applications) deployed on servers 249, customer applications 295, and so forth. In one example, SFCs may be controlled (e.g., established, maintained, reconfigured, torn down, and so forth) by SFC orchestrator 219 and/or SDN controller 215 in conjunction with host 268 (e.g., the virtualization layer 270 component of host 268), servers 249, and so on. In the example of FIG. 2, an SFC may include a service on one of the servers 249, one of the service provider applications 290, and/or one of the customer applications 295. In one example, the SFC may further include additional applications/services, e.g., downstream from one of customer applications 295. The services/applications in the SFC may exchange bearer traffic, e.g., via the fourth tunnel 284 between the one of service provider applications 290 and one or more of servers 249, via a fifth tunnel 285 between one of service provider applications 290 and the one of the customer applications 295, and via a sixth tunnel 286 between the one of customer applications 295 and any additional applications/services in the SFC, and so on.

The fifth tunnel 285 and sixth tunnel 286 may be the same as or similar to the tunnels 281-284. Although the one of service provider applications 290 and the one of customer applications 295 both reside on host 268, the fifth tunnel 285 indicates that the respective applications logically may comprise separate devices which address one another as peers using various network communication protocols. For instance, the one of customer applications 295 may also include a vNIC (not shown) for interfacing with the one of service provider applications 290 via vNIC 292. The sixth tunnel 286 may represent a tunnel between one of customer applications 295 and an additional customer application deployed on another device within local network 260, or an application/service in an external network. In one example, a plurality of tunnels in the SFC may share encryption keys and/or other parameters, such as quality of service (QoS)/ priority flags, Multi-Protocol Label Switching (MPLS) labels, SFC identifiers (e.g., network service headers (NSHs)), and so forth.

It should be noted that SFCs may include non-serial or non-linear topologies. For instance, an SFC may have a tree structure with one or more branches, and irregular structure with one or more paths that may lead to a given application/service, and so forth. Thus, in one example, an SFC may split and splice traffic, or route traffic differently depending upon the parameters of the traffic, the time of day, day of the week, network congestion, or other factors. For instance, video and audio channels may be separated from a media stream at a first service/application, processed separately by different customer and/or service provider applications, and then re-mixed by yet another customer and/or service provider application. In one example, the establishment, tearing down, maintenance, reconfiguring, and other management tasks relating to SFCs, including the establishment of a particular SFC topology, may be performed by SFC orchestrator 219, e.g., via instructions to SDN controller 215, via instructions to service provider application(s) 290 (e.g., via second tunnel 282), via instructions to servers 249, and so forth.

It should also be noted that in the example of FIG. 2, the servers 249 with other services are illustrated external to telecommunication network 210. However, it should be understood that in other, further, and different examples, the servers 249 may also represent additional components of telecommunication network 210, e.g., NFVI for hosting other service provider applications, other customer applications, applications of different customers, and so forth. In a different example, the first tunnel 281 and the second tunnel 282 may have separate encryption, but may also utilize an encryption technique of an additional tunnel (e.g., a dual layer encryption scheme). Similarly, a single session (tunnel) between the telecommunication network 210 and the host 268 may be shared among the signaling, management, and bearer traffic. In addition, for ease of illustration various intermediate devices, such as gateways, border elements, layer 3 routers, MPLS routers, SFC forwarders, and so forth are omitted from FIG. 2. Thus, these and other modifications are all contemplated within the scope of the present disclosure.

Figure 3:
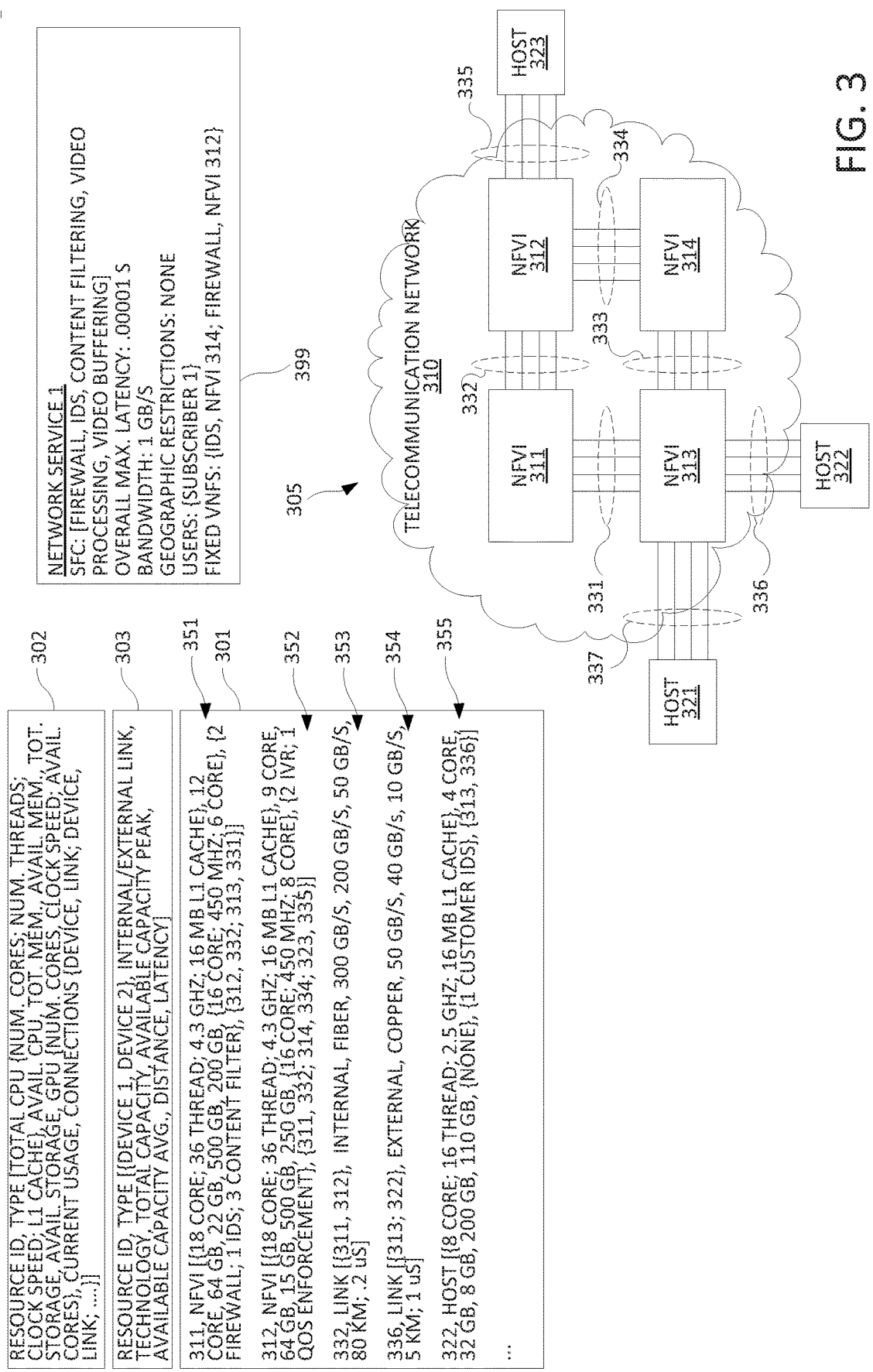
FIG. 3 illustrates an example of overlaying a network service via a dynamic learning map, in accordance with the present disclosure.

FIG. 3 illustrates an example of overlaying a network service via a dynamic learning map. For instance, FIG. 3 illustrates a dynamic learning map in a record set (301) form and in a visual map (305) form. The record set 301 includes a number of records 351-355, each representing one of the resources in the system. The visual map 305 may represent the same or a similar system as the system 100 of FIG. 1 or system 200 of FIG. 2. For example, the visual map 305 includes a telecommunication network 310 with a plurality of NFVI 311-314, as well as hosts 321-323. Each of NFVI 311-314 may represent one or more co-located physical devices, e.g., a server or a plurality of servers in a data center location. The hosts 321-323 may represent customer premises-based devices, such as host 168 or devices 166 of FIG. 1, or host 268 of FIG. 2. In one example, each of the hosts 321-323 may be controlled by a single entity, but may be deployed in different physical locations and may have separate connections to the telecommunication network 310.

As illustrated in FIG. 3, the visual map 305 may be derived from the record set 301. For example, the records 351-355 in record set 301 may take one of several forms. For instance, record template 302 may be used for computing resources, e.g., telecommunication network-based NFVI/hosts and for customer premises-based hosts, while record template 303 may be used for links between computing resources. For illustrative purposes, records 351 and 352 relate to NFVI 311 and 312, respectively; records 353 and 354 relate to links 332 and 336, respectively; and record 355 relates to host 322. It should be noted that record set 301 may include additional records for other NFVI, hosts, and links (omitted from FIG. 3 for clarity). To illustrate, the record for NFVI 311 may comprise the following: [311, NFVI, [{18 CORE; 36 THREAD; 4.3 GHZ; 16 MB L1 CACHE}, 12 CORE; 64 GB, 22 GB, 500 GB, 200 GB, {16 CORE; 8 CORE; 450 MHZ}, {2 FIREWALL; 1 IDS; 3 CONTENT FILTER}, {312, 332; 313, 331}]. The last set of number indicates the other devices (e.g., hosts, NFVI, non-NFVI devices) to which NFVI 311 is connected, and the links via which the devices are connected. Accordingly, the set of records 301 may be used to construct the visual map 305.

In accordance with the present disclosure, a processing system (e.g., of a SFC orchestrator) may overlay an SFC for a new network service on the dynamic learning map. For instance, the new network service may comprise a plurality of service provider applications (e.g., VNFs) that are arranged in a SFC. In one example, the preferred devices (e.g., NFVI or non-NFVI/non-SDN-based devices) to implement the VNFs and the preferred links/path(s) through the network are first identified. In other words a preferred SFC deployment may be identified. The identification of the preferred devices and links may be based upon the assumption that there are no other competing network services, that no devices or links are overloaded, and so forth. The preferred devices and links may be identified based upon the locations of customer premises and links available to customer premises that will utilize the new network service, locations of fixed (or relatively fixed) source device(s), such as a content distribution network (CDN) edge server, a video-on-demand (VoD) server, and so forth, the links available to such device(s), the lengths/distances of the respective links, and so on. For example, a network service may have a restriction that it must be entirely contained within the boundaries of a particular state. Thus, the processing system may consider only devices and links meeting this geographic criterion for the preferred devices and links. In another example, the network service may have a latency requirement such that links over a certain length may be excluded from consideration (e.g., due to the distance inherently failing to comply with the latency requirement).

The preferred devices and links may be further identified based upon the total capacities of the devices and links, such as the total central processing unit (CPU) capabilities, the total graphical processing unit (GPU) capabilities, the total device memory, the total device storage, the total link bandwidth, and so forth, as well as other fixed parameters of the devices and links. For instance, a service provider application/VNF of the network service may involve code to be executed via one or more GPUs. Thus, NFVI without GPU resources may be excluded from consideration for the placement of this particular VNF in a preferred SFC deployment. In addition, in one example, minimal latency for service delivery may be used as an optimization criteria for overlaying a preferred deployment for the SFC on the dynamic learning map. For instance, network services relating to time sensitive traffic (video, interactive video, interactive audio, etc.), latency may be a primary factor to account for when calculating optimal network service overlays.

In one example, the processing system based upon the devices' resources and current utilizations, and the network service deployment needs, may identify the VNFs that can be spun-up on the devices that are identified (or VNFs that are already deployed on such devices and which may be assigned to or otherwise utilized in the SFC for the network service). For instance, as illustrated in FIG. 3, the record 301 indicates that NFVI 311 has 12 cores utilized (out of 18 total available cores). Thus, 6 cores are available for assignment to and/or use by one or more service provider applications of the new network service. In addition, 22 GB out of 64 total GB of memory are in use. Thus, 42 GB remain assignable. Similarly, 250 GB out of 500 GB storage capacity is in use. Thus, 250 GB of storage capacity remains assignable to one or more service provider applications of the new network service. Likewise, according to record 353, link 332 has a peak capacity of 300 GB/s, whereas 50 GB/s is currently reserved, and where 200 GB/s peak utilization is permitted. Thus, bandwidth of 200 GB/s remains assignable to the new network service. It should be noted that 250 GB/s appears to be unassigned and available. However, in one example, the nominal/assigned bandwidth may not exceed the peak allowable of 200 GB/s. Additional factors of the same or a similar nature may be considered with respect to the other records 352, 354, 355, etc. regarding the other NFVI, hosts, and links of the system. In any event, the processing system may compare the service needs of the new network service, in association with the preferred SFC overlay, to determine whether each link, and each NFVI and/or host can accommodate the anticipated traffic and/or anticipated usage of memory, CPU, storage, and so forth by the service provider application(s)/VNF(s) intended for the resource.

In the present example, the SFC for a new network service ("network service 1") may be indicated in record 399. For instance, the SFC may include firewall, intrusion detection system (IDS), content filtering, video processing, and video buffering. The overall maximum latency may be 0.00001 seconds and the bandwidth need may be 1 GB/s. The network service may be for use by subscriber 1, which may have customer premises at locations associated with hosts 321 and 322. For example, the network service may be for inter-facility video conferencing for subscriber 1. In addition, the network service may have designated fixed locations for certain VNFs. In the present case, the IDS VNF may be restricted to deployment on NFVI 314, while the firewall VNF may be restricted to deployment at NFVI 312. For instance, the operator of telecommunication network 310 may make these service provider applications available to customers/subscribers as part of SFCs, but may wish to keep these VNFs highly secure within the telecommunication network 310 at specific locations. In contrast, other VNFs may be less restricted and may be deployed anywhere in telecommunication network 310, at hosts 321-323 and/or at other customer premises-based devices, and so forth.

It should also be noted that in one example, the processing system may utilize additional records relating to the specific requirements of different service provider applications/VNFs. For example, a record for the video processing VNF may indicate the memory requirement of the VNF, the amount of storage required for the code and/or other data relating to the VNF, may indicate that the VNF requires GPU resources, and so forth. Thus, continuing with the present example, the processing system may identify that the video processing VNF may be deployed to NFVI 311 or 312, but may not be deployed to host 322 (which lacks GPU resources).

In one example, where there is no availability to accommodate one or more of the VNFs at one or more of the preferred NFVI and/or host devices (e.g., due to assignment and/or reservation for other SFCs), the processing system may arrange for handoffs of functionality between VNFs on the intended NFVI and/or host device(s) and "neighboring" NFVI and/or host devices. Similarly, where there is insufficient capacity available for a preferred link, the processing system may select one or more alternative links that can accommodate the traffic increase from the new network service. In addition, the selection of secondary/non-preferred link(s) may also result in a change in one or more preferred NFVI and/or host devices. For instance, the secondary/non-preferred link(s) may have endpoints which are in different geographic location(s) from the one or more preferred NFVI and/or host devices. In addition, it may increase the latency or have other negative outcomes if the SFC were to still include the one or more preferred NFVI and/or host devices. Accordingly, the NFVI and/or host device(s) selected for one or more VNFs may also change along with the link(s). For example, for the "network service 1," the processing system may identify that NFVI 313 is the preferred location for video buffering. However, due to existing assignments, the NFVI 313 may be currently unable to accommodate the video buffering VNF for the new network service. However, host 321 may be available and may have sufficient resources. Thus, the processing system may reassign the video buffering to the host 321. Notably, the quality of service may increase for users at a same customer premises as host 321, e.g., due to the increased proximity. However, the quality of service for users at a customer premises of host 322 may experience a slight decline due to increased distance from the last VNF in the SFC to the users. Nevertheless, the overall utilization of the system may be optimized, accounting for the preferences for "network service 1" in addition to various other network services.

In this regard, it should also be noted that in one example, existing network services may take precedence over new network services to be deployed in a SFC. In another example, a new network service may be designated to have priority over one or more existing network services. For instance, a network operator may provide for a network service to have a higher priority ranking when the network service is deemed to be of widespread public interest, when the network service is deemed important for the integrity of the overall network, when one or more customers indicate an interest in the network service having a higher priority, and so forth.

In one example, each network service may have a priority ranking which may be used to balance the SFC deployments of different network services throughout the network. However, it should be noted that some service provider applications (VNFs) may be part of multiple SFCs for different network services. Thus, decisions of whether to move a VNF to a different NFVI and/or host device in connection with a new network service deployment may also take into account the requirements of multiple SFCs that may rely upon the VNF. In one example, when selecting a different NFVI and/or host device(s) for a VNF, an anticipated change in latency may be calculated. For instance, the neighboring NFVI/host device(s) resulting in the least increase in latency may be selected. In this regard, it should be noted that a change from a preferred NFVI/host device to one or more neighboring devices may also be accompanied by a change in the link(s) carrying the traffic for the network service, which may also be taken into account in determining the alternative device(s) to deploy the VNF. As such, the processing system reconfigures the telecommunication network, optimized with an expectation of minimal latency characteristics for service delivery.

Figure 4:
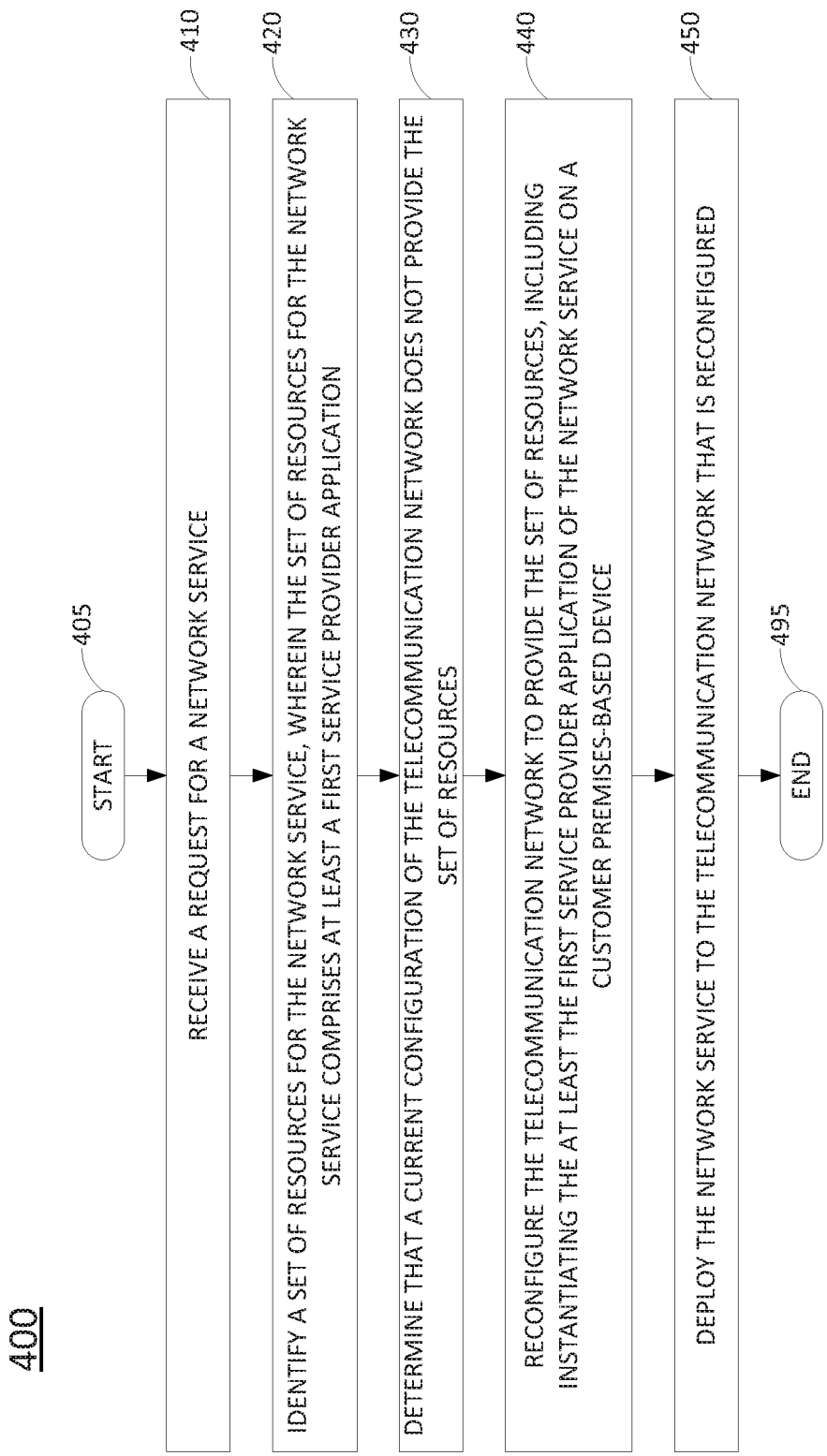
FIG. 4 illustrates a flowchart of an example method for instantiating a service provider application of a network service on a customer premises-based device.

FIG. 4 illustrates a flowchart of an example method 400 for instantiating a service provider application of a network service on a customer premises-based device, in accordance with the present disclosure. In one example, the method 400 is performed by an SFC orchestrator and/or an SDN controller deployed in a telecommunication network, or any one or more components thereof (e.g., one or more processors performing operations in accordance with instructions loaded into a memory), or by an SFC orchestrator and/or SDN controller in conjunction with one or more other devices, such as an OSS, an application server, NFVI, a host device, one or more remote servers, and so forth. In one example, the steps, functions, or operations of method 400 may be performed by a computing device or system 500, and/or a processing system 502 as described in connection with FIG. 5 below. For instance, the computing device 500 may represent at least a portion of an SFC orchestrator, an SDN controller, an OSS, an application server, a host, and so forth in accordance with the present disclosure. For illustrative purposes, the method 400 is described in greater detail below in connection with an example performed by a processing system, such as processing system 502. The method 400 begins in step 405 and proceeds to step 410.

At step 410, the processing system (deployed in a telecommunication network) receives a request for a network service. For example, the network service may comprise a service function chain (SFC) including at least one service provider application. For instance, the at least the one service provider application may comprise a virtual network function (VNF). The request may be received from a customer/subscriber device, may be received from a device of a network operator, a network technician, or the like, or may be received from one or more automated systems within the telecommunication network.

At step 420, the processing system identifies a set of resources for the network service, the set of resources for the network service comprising at least a first service provider application. For instance, in one example the request received at step 410 may identify the parameters of the SFC, including the service provider applications/VNFs, the arrangement of the service provider applications, latency requirements, locational/geographic restrictions, and so forth. In another example, the request may identify the network service, and the processing system may access a database storing information regarding the SFC for the network service to identify the set of resources.

In one example, the set of resources for the network service comprises at least one locational requirement for the network service. For instance, the at least one locational requirement may comprise a proximity to at least one client device for the network service, a geographic restriction, a restriction to a subnet or a group of subnets, a restriction to a type of host device, or a restriction to a particular host device. The at least one locational requirement may be for the network service in general, or for one or more particular service provider applications within the network service (e.g., within the SFC of the network service). Alternatively, or in addition, the set of resources may also include a restriction of one or more applications of the network service to be deployed only on telecommunication network infrastructure or only on customer premises-based devices. In one example, the set of resources for the network service may alternatively or additionally comprise a latency requirement for the network service. The latency requirement can be identified as being between applications of the network service, for the delivery of data to at least one customer device of the network service, or for the end-to-end traffic of the network service.

At step 430, the processing system determines that a current configuration of the telecommunication network does not provide the set of resources. For instance, at step 430 the processing system may determine that the current configuration of the telecommunication network does not provide the set of resources in accordance with a dynamic learning map of the telecommunication network. In one example, the dynamic learning map may comprise a network topology database which may include links and nodes of the telecommunication network. In addition, the dynamic learning map (e.g., a network topology database) further includes capacities of the links and the nodes, and current utilizations of the links and the nodes. The dynamic learning map may further include information of the connectivity between the nodes via the links. In addition, the dynamic learning map may further include at least one link to a customer premises and at least one node of the customer premises. In one example, step 430 may be performed in accordance with the example of FIG. 3 discussed above.

At step 440, the processing system reconfigures the telecommunication network to provide the set of resources. In particular, in accordance with the present disclosure, the reconfiguring the telecommunication network to provide the set of resources includes instantiating the at least the first service provider application on a customer premises-based device (e.g., a host device). For instance, the reconfiguring the telecommunication network to provide the set of resources may comprise extending the telecommunication network edge to include the customer premises-based device. In one example, at least a portion of the customer premises-based device (e.g., a separate virtual machine) may be assigned for the use of one or more service provider applications. In addition, in one example, step 440 may include sending at least a first instruction to a virtual machine monitor (VMM) of the customer premises-based device to instantiate the at least the first service provider application on the customer premises-based device.

The customer-premises based device may be deployed in a local network of the customer that is connected to or otherwise in communication with the telecommunication service provider network (e.g., via an access network operated by a same entity as the telecommunication service provider network or a different entity (e.g., a third-party access network)). In an example where the telecommunication service provider network and the customer premises device are connected via a third-party access network, a first tunnel may be established via the third-party access network over which the at least the first instruction may be sent. In one example, the VMM is operated by the telecommunication service provider network. In another example the VMM is operated by the customer and is controllable by the telecommunication service provider network.

In one example, the reconfiguring may further include instantiating at least a second service provider application of the network service on at least one host device of the telecommunication network (e.g., NFVI). Step 440 may also include assigning bandwidth of a link between host devices to the service provider applications and/or the network service. In one example, step 440 may alternatively or additionally include transferring at least a second service provider application from at least a first host device of the telecommunication network to at least a second host device of the telecommunication network. For example, step 440 may comprise operations in accordance with the example of FIG. 3 discussed above.

At step 450, the processing system deploys the network service to the telecommunication network that is reconfigured. In one example, the deploying the network service to the telecommunication network that is reconfigured includes activating the SFC for the network service. For instance, in one example, the SFC may include the at least the first service provider application and the at least the second service provider application. In one example, step 450 may comprise sending at least a second instruction to the at least the first service provider application instantiated on the customer premises-based device to configure at least the first service provider application to operate in a service function chain of the network service. In addition, step 450 may further include sending instructions to a plurality of respective VNFs/service provider applications to configure each such VNFs/service provider applications to be part of the SFC for the network service.

Following step 450, the method 400 proceeds to step 495 where the method ends.

It should be noted that the method 400 may be expanded to include additional steps or may be modified to include additional operations with respect to the steps outlined above. For example, the method 400 may be expanded to include repeating the steps 420-450 through multiple iterations, e.g., to establish additional new network services, to configure additional service provider applications into SFCs, etc. In one example, the network service associated with the method 400 may also include customer application(s) which are stitched into the SFC, and which may be deployed on customer equipment or on network service provider equipment on behalf of customer. In another example, the method 400 may be expanded to include decommissioning service provider application(s) and/or the network service. In still another example, the method 400 may be expanded to include reconfiguring the service provider applications in terms of performance within the current network service/SFC or to cause the service provider application(s) to operate in one or more different SFCs. Thus, these and other modification are all contemplated within the scope of the present disclosure.

In addition, although not expressly specified above, one or more steps of the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. Furthermore, operations, steps or blocks of the above described method can be omitted, combined, separated, and/or performed in a different order from that described above, without departing from the example embodiments of the present disclosure. For instance, any one or more steps of the above recited method 400 may comprise optional steps in various additional examples.

Figure 5:
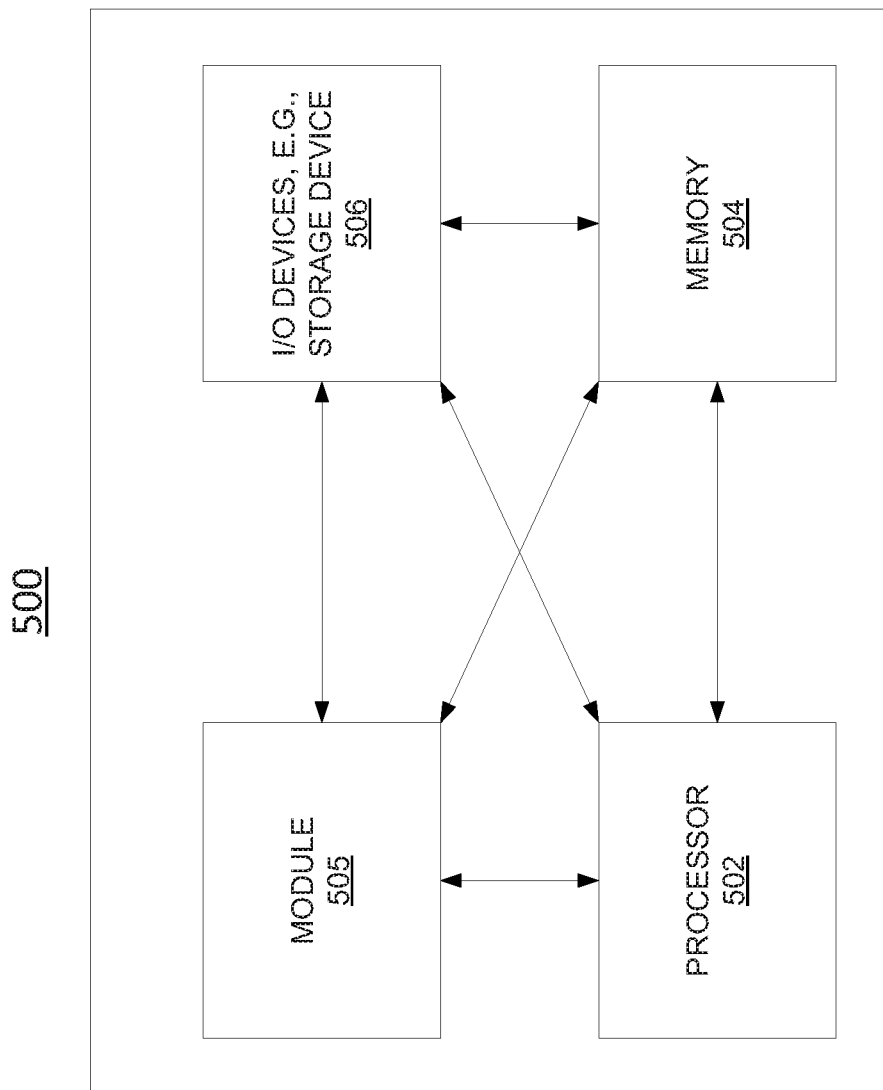
FIG. 5 illustrates a high level block diagram of a computing device specifically programmed to perform the steps, functions, blocks and/or operations described herein.

FIG. 5 depicts a high-level block diagram of a computing device or processing system specifically programmed to perform the functions described herein. For example, any one or more components or devices illustrated in FIG. 1 or described in connection with the method 400 may be implemented as the processing system 500. As depicted in FIG. 5, the processing system 500 comprises one or more hardware processor elements 502 (e.g., a microprocessor, a central processing unit (CPU) and the like), a memory 504, (e.g., random access memory (RAM), read only memory (ROM), a disk drive, an optical drive, a magnetic drive, and/or a Universal Serial Bus (USB) drive), a module 505 for instantiating a service provider application of a network service on a customer premises-based device, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computing devices. For example, when the present method(s) are implemented in a distributed or parallel manner, any one or more steps of the present method(s) can be implemented by any one or more of the multiple or parallel computing devices of the processing system. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for instantiating a service provider application of a network service on a customer premises-based device (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/ or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for instantiating a service provider application of a network service on a customer premises-based device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   receiving, by a processing system including at least one processor deployed in a telecommunication network, a request for a network service;
   identifying, by the processing system, a set of resources for the network service, wherein the set of resources for the network service comprises at least a first service provider application and at least a second service provider application;
   determining, by the processing system, that a current configuration of the telecommunication network does not provide the set of resources;
   reconfiguring, by the processing system, the telecommunication network to provide at least a first portion of the set of resources, wherein the at least the first portion of the set of resources comprises the at least the second service provider application;
   instantiating, by the processing system, the at least the first service provider application of the network service on a customer premises-based device that is deployed at a customer premises, wherein the at least the first service provider application comprises at least a second portion of the set of resources; and
   deploying, by the processing system, the network service to the telecommunication network that is reconfigured and the customer-premises based device, wherein the deploying the network service to the telecommunication network that is reconfigured comprises activating a service function chain for the network service, the service function chain including the at least the first service provider application on the customer premises-based device and the at least the second service provider application on at least one host device of the telecommunication network.

2. The method of claim 1, wherein the determining that the current configuration of the telecommunication network does not provide the set of resources is determined in accordance with a dynamic learning map of the telecommunication network.

3. The method of claim 2, wherein the dynamic learning map comprises a network topology database.

4. The method of claim 2, wherein the dynamic learning map includes links and nodes of the telecommunication network, wherein the dynamic learning map further includes capacities of the links and the nodes and current utilizations of the links and the nodes.

5. The method of claim 4, wherein the current utilizations of the links and the nodes include information of connectivity between the nodes via the links.

6. The method of claim 2, wherein the dynamic learning map further includes at least one link to the customer premises and at least one node of the customer premises.

7. The method of claim 1, wherein the set of resources for the network service comprises at least one locational requirement for the network service.

8. The method of claim 7, wherein the at least one locational requirement comprises:
   a proximity to at least one client device for the network service;
   a geographic restriction;
   a restriction to a subnet or a group of subnets;
   a restriction to a type of host device; or
   a restriction to a particular host device.

9. The method of claim 1, wherein the set of resources for the network service comprises a latency requirement for the network service.

10. The method of claim 1, wherein the reconfiguring the telecommunication network to provide the at least the first portion of the set of resources comprises:
    instantiating the at least the second service provider application of the network service on the at least one host device of the telecommunication network.

11. The method of claim 1, wherein the reconfiguring the telecommunication network to provide the at least the first portion of the set of resources comprises:
    transferring the at least the second service provider application from at least a first host device of the telecommunication network to at least a second host device of the telecommunication network, the at least the second host device of the telecommunication network comprising the at least one host device of the telecommunication network.

12. The method of claim 1, wherein the at least the first service provider application comprises a virtual network function.

13. The method of claim 1, wherein the reconfiguring the telecommunication network to provide the at least the first portion of the set of resources comprises:
    extending a telecommunication network edge to include the customer premises-based device.

14. The method of claim 1, wherein the instantiating the at least the first service provider application of the network service on the customer premises-based device comprises:
    sending at least a first instruction to a virtual machine monitor of the customer premises-based device to instantiate the at least the first service provider application on the customer premises-based device.

15. The method of claim 14, wherein the deploying the network service to the telecommunication network that is reconfigured and the customer-premises based device comprises:
    sending at least a second instruction to the at least the first service provider application instantiated on the customer premises-based device to configure the at least the first service provider application to operate in the service function chain for the network service.

16. The method of claim 14, wherein the customer premises-based device is operated by a customer of the telecommunication network and wherein the virtual machine monitor is:
    operated by the telecommunication network; or
    operated by the customer and is controllable by the telecommunication network.

17. A non-transitory computer-readable medium storing instructions which, when executed by a processing system of a telecommunication network including at least one processor, cause the processing system to perform operations, the operations comprising:
    receiving a request for a network service;
    identifying a set of resources for the network service, wherein the set of resources for the network service comprises at least a first service provider application and at least a second service provider application;
    determining that a current configuration of the telecommunication network does not provide the set of resources;
    reconfiguring the telecommunication network to provide at least a first portion of the set of resources, wherein the at least the first portion of the set of resources comprises the at least the second service provider application;
    instantiating the at least the first service provider application of the network service on a customer premises-based device that is deployed at a customer premises, wherein the at least the first service provider application comprises at least a second portion of the set of resources; and
    deploying the network service to the telecommunication network that is reconfigured and the customer-premises based device, wherein the deploying the network service to the telecommunication network that is reconfigured comprises activating a service function chain for the network service, the service function chain including the at least the first service provider application on the customer premises-based device and the at least the second service provider application on at least one host device of the telecommunication network.

18. A device comprising:
    a processing system of a telecommunication network including at least one processor; and
    a computer-readable medium storing instructions which, when executed by the processing system, cause the processing system to perform operations, the operations comprising:
    receiving a request for a network service;
    identifying a set of resources for the network service, wherein the set of resources for the network service comprises at least a first service provider application and at least a second service provider application;
    determining that a current configuration of the telecommunication network does not provide the set of resources;
    reconfiguring the telecommunication network to provide at least a first portion of the set of resources, wherein the at least the first portion of the set of resources comprises the at least the second service provider application;
    instantiating the at least the first service provider application of the network service on a customer premises-based device that is deployed at a customer premises, wherein the at least the first service provider application comprises at least a second portion of the set of resources; and deploying the network service to the telecommunication network that is reconfigured and the customer-premises based device, wherein the deploying the network service to the telecommunication network that is reconfigured comprises activating a service function chain for the network service, the service function chain including the at least the first service provider application on the customer premises-based device and the at least the second service provider application on at least one host device of the telecommunication network.

19. The device of claim 18, wherein the determining that the current configuration of the telecommunication network does not provide the set of resources is determined in accordance with a dynamic learning map of the telecommunication network.

20. The device of claim 19, wherein the dynamic learning map comprises a network topology database.

* * * * *